United States Patent
Mueller

(10) Patent No.: US 11,192,224 B2
(45) Date of Patent: Dec. 7, 2021

(54) TOOL AND METHOD FOR INSERTING AND REMOVING COMPONENTS

(71) Applicant: Michael Mueller, Bad Staffelstein (DE)

(72) Inventor: Michael Mueller, Bad Staffelstein (DE)

( * ) Notice: Subject to any disclaimer, the term of this patent is extended or adjusted under 35 U.S.C. 154(b) by 561 days.

(21) Appl. No.: 15/608,206

(22) Filed: May 30, 2017

(65) Prior Publication Data

US 2018/0029208 A1  Feb. 1, 2018

(30) Foreign Application Priority Data

Jul. 27, 2016  (DE) .......................... 102016213811.1

(51) Int. Cl.
*B25B 27/06* (2006.01)
*B25B 27/02* (2006.01)
*B60B 29/00* (2006.01)
*B60B 35/18* (2006.01)

(52) U.S. Cl.
CPC ............ *B25B 27/06* (2013.01); *B25B 27/023* (2013.01); *B25B 27/062* (2013.01); *B60B 29/00* (2013.01); *B60B 35/18* (2013.01); *Y10T 29/53104* (2015.01); *Y10T 29/53878* (2015.01)

(58) Field of Classification Search
CPC ....... B25B 27/06; B25B 27/062; B60B 35/18; B60B 29/00; Y10T 29/53887; Y10T 29/5199; G05B 2219/49112; G05B 2219/50152
USPC ......... 29/263, 253, 264, 265, 724, 270, 280, 29/259; 254/24, 5 R, 351
See application file for complete search history.

(56) References Cited

U.S. PATENT DOCUMENTS

| | | | | |
|---|---|---|---|---|
| 1,465,124 A | * | 8/1923 | Gardnerjr | B25B 27/062 29/263 |
| 2,520,162 A | * | 8/1950 | Morrison | B25B 27/062 29/263 |
| 3,327,377 A | * | 6/1967 | German | B25B 27/062 29/263 |
| 3,986,383 A | * | 10/1976 | Petteys | B21D 1/08 72/393 |

(Continued)

FOREIGN PATENT DOCUMENTS

| | | |
|---|---|---|
| DE | 002951366 A1 * | 12/1979 |
| DE | 2951366 A1 | 7/1981 |

(Continued)

OTHER PUBLICATIONS

Mueller Kueps Twin-Cone Wheel Bearing Kit extracted from https://www.mueller-kueps.com/wp-content/uploads/SellSheet-432-005_lowres.pdf (Year: 2020).*

(Continued)

*Primary Examiner* — Mahdi H Nejad
(74) *Attorney, Agent, or Firm* — Millen, White, Zelano & Branigan, P.C.; William Nixon

(57) ABSTRACT

A tool for inserting and removing components, in particular bearings, bushes or the like, particularly in the automotive sector, has a spindle, a first sleeve body having a first ramp-form outer circumferential surface and a through-hole, through which the spindle can be axially guided, a second sleeve body having a second ramp-form outer circumferential surface and a through-hole, through which the spindle can be axially guided, and also a first pressure body and a second pressure body.

3 Claims, 4 Drawing Sheets

(56) References Cited

U.S. PATENT DOCUMENTS

| | | | | |
|---|---|---|---|---|
| 5,165,169 A | * | 11/1992 | Boyce | B25B 27/062 29/263 |
| 6,158,110 A | * | 12/2000 | Takacs | B25B 27/062 29/259 |
| 6,345,426 B1 | * | 2/2002 | Collier | B25B 5/147 29/263 |
| 6,389,668 B1 | * | 5/2002 | Hwang | B25B 27/062 29/263 |
| 6,823,574 B2 | * | 11/2004 | Swanson | B25B 27/023 29/264 |
| 8,443,500 B2 | * | 5/2013 | Huang | B25B 27/062 29/260 |
| 2002/0000141 A1 | * | 1/2002 | McMillian | B23B 23/04 82/148 |
| 2002/0095759 A1 | * | 7/2002 | Scott | B25B 27/0035 29/263 |
| 2003/0041431 A1 | * | 3/2003 | Heflin | B25B 27/064 29/263 |
| 2003/0041432 A1 | * | 3/2003 | Heflin | B25B 27/062 29/263 |
| 2008/0216608 A1 | * | 9/2008 | Schuchardt | B25B 27/062 81/52 |
| 2008/0273826 A1 | * | 11/2008 | Muller | B25B 27/062 384/609 |
| 2008/0313888 A1 | | 12/2008 | Mueller et al. | |
| 2009/0106963 A1 | * | 4/2009 | Acciardo, Jr. | B25B 27/062 29/270 |
| 2012/0036691 A1 | * | 2/2012 | Mueller | B25B 27/062 29/263 |

FOREIGN PATENT DOCUMENTS

| | | |
|---|---|---|
| DE | 3017595 A1 | 11/1981 |
| DE | 3443249 C2 | 6/1986 |
| DE | 202006014102 * | 11/2006 |
| DE | 202006014102 U1 | 11/2006 |
| EP | 1837127 A2 | 9/2007 |
| GB | 2064411 A | 6/1981 |
| JP | H11333748 A | 12/1999 |

OTHER PUBLICATIONS

European Search Report for EP17182895 dated Dec. 6, 2017.
English Abstract for DE202006014102, Publication Date: Nov. 23, 2006.
English Abstract for EP1837127, Publication Date: Sep. 26, 2007.
Office Action for DE-10 2016 213 811.1 dated Jul. 5, 2017.
English Abstract of DE3443249, Publication Date: Dec. 18, 1986.
English Abstract of DE2951366, Publication Date: Jul. 9, 1981.
English Abstract of DE3017595, Publication Date: Nov. 12, 1981.
English Abstract of JPH11333748, Publication Date: Dec. 7, 1999.
Search report in corresponding EP application 17182985.7 dated Oct. 25, 2018 (pp. 1-6).

* cited by examiner

TOOL AND METHOD FOR INSERTING AND REMOVING COMPONENTS

FIELD OF THE INVENTION

The present invention relates to a tool and to a method for inserting and removing components, in particular bearings, bushes and the like, particularly in the automotive sector, into or from a component mount.

BACKGROUND

In the automotive sector, in order to carry out repairs, components such as bearings, for example ball bearings, silent bearings or the like have to be replaced from time to time, due to wear. For this purpose, it is necessary to remove the components from a component mount, particularly in the form of a hole, or to move the components into said mount.

Since particularly in the automotive sector or generally in mechanical engineering, many different types of bearings and bushes are used, many tools are required which are in most cases individually adapted to the respective type of bearing.

DE 34 43 249 C2 discloses a tool for inserting and removing bearings into or from bearing mounts, in which tool a first pressure disc, arranged on a spindle, presses against the bearing from a first side and a second pressure disc, also sitting on the spindle, rests against the bearing mount from an opposite second side. In order to fix the position of the tool with respect to the bearing, an outer contour of the first pressure disc is adapted in a complementary manner to a contact region of the inner contour of the bearing. The bearing is removed or inserted by a movement of the pressure discs relative to one another. In this respect, the second spindle is supported on the bearing mount.

SUMMARY OF THE INVENTION

It is an idea of the present invention is to provide a tool and a method for inserting and removing components, in particular bearings, bushes and the like, by which different types of components can be mounted and demounted in an improved manner.

According to a first aspect of the invention, a tool for inserting and removing components, in particular bearings, bushes or the like, particularly in the automotive sector, into or from a component mount is provided, comprising a spindle, a first sleeve body with a first ramp-form outer circumferential surface for resting on the component in a clearance-free and centred manner, and a through-hole through which the spindle can be axially guided, with a second sleeve body having a second ramp-form outer circumferential surface for resting on the component in a clearance-free and centred manner, and a through-hole through which the spindle can be axially guided, it being possible to provide the second sleeve body such that the second ramp-form outer circumferential surface is located facing the first ramp-form outer circumferential surface, with a first pressure body which can be coupled to the first sleeve body to axially apply pressure thereto, and with a second pressure body which can be coupled to the second sleeve body to axially apply pressure thereto.

Accordingly, a tool having an elongate spindle is provided, onto which a first sleeve body and a second sleeve body can be attached or pushed. The spindle has a longitudinal axis which defines the axial direction. In particular, the spindle can be guided through the sleeve bodies. The sleeve bodies can each be subjected to an axial force by means of a pressure body which is associated with the respective sleeve body.

The sleeve bodies each have outer circumferential surfaces which extend in the form of a ramp. The first ramp-form outer circumferential surface forms a surface of revolution around a first centre axis of the sleeve. The second ramp-form outer circumferential surface forms a surface of revolution around a second centre axis of the sleeve. When the sleeve bodies have been pushed onto the spindle, the spindle longitudinal axis, the first sleeve centre axis and the second sleeve centre axis extend along each other, or they are approximately identical.

Furthermore, the pressure bodies can each be arranged on the spindle such that the first and the second sleeve bodies are both arranged between the first and the second pressure bodies. This state can be called the assembled state of the tool.

According to an idea of the invention, the first and the second sleeve body can be respectively provided such that the second ramp-form outer circumferential surface faces the first ramp-form outer circumferential surface. In the assembled state of the tool, the sleeve bodies can thus be arranged in particular on the spindle such that the external diameter, defined by the outer circumferential surfaces, of the sleeve bodies decreases along the spindle longitudinal axis, due to the ramp-form shape thereof, towards a region located in an axial direction between the sleeve bodies.

The ramp-form outer circumferential surfaces respectively taper along the respective sleeve centre axis and can therefore be introduced in part into an inner hole in a component from opposite sides. In so doing, the outer circumferential surfaces rest substantially without clearance against the component. Furthermore, the respective sleeve body is centred by itself with respect to the longitudinal axis of the inner hole in the component due to the ramp-form course of the outer circumferential surface. When the spindle is guided through the holes in the sleeve bodies and also through the holes in the component, the spindle is also centred very accurately with respect to the longitudinal axis of the inner hole in the component. This very reliably prevents the component from becoming jammed in the component mount during removal or insertion. In addition, the tool can be positioned particularly quickly against a component to be inserted or removed due to the clearance-free self-centring. Furthermore, the positioning accuracy of the tool is improved because manual centring or orienting is not required. Moreover, one and the same sleeve bodies can be used for a large number of hole diameters due to the ramp-form course of the outer circumferential surfaces. This significantly broadens the range of use of the tool.

The component can be clamped in particular between the ramp-form outer circumferential surfaces of the sleeve bodies. A particularly reliable fixing of the component on the tool is achieved thereby. Furthermore, none of the sleeve parts has to be supported on the component mount. This is particularly advantageous in spatially narrow assembly regions of the component, and the component is prevented from becoming jammed in the component mount.

In particular, the first and the second sleeve body can be formed identically or differently. For example, the first and the second outer circumferential surface can have or can form identical or different ramp shapes. Furthermore, a maximum external diameter, defined by an axial end of the respective outer circumferential surface, of the sleeve bodies can be identical or different for the first and the second sleeve body. According to another embodiment, the first sleeve body and the second sleeve body have different external diameters with the same shape of the ramp-form course of the respective outer circumferential surface.

It can be provided that the first ramp-form outer circumferential surface and/or the second ramp-form outer circumferential surface is formed conically. When the ramp-form outer circumferential surface is conical, said outer circumferential surface includes a cone angle with the centre axis of the sleeve. If both the first and the second sleeve body are formed with conical outer circumferential surfaces, they can have the same cone angle with different external diameters.

However, it can also be provided that the outer circumferential surfaces have different cone angles. A conical shape of the ramp-form course of the outer circumferential surface affords the advantage that this conical shape produces an extremely reliable centring of the sleeve body with a simple construction.

In particular, the first ramp-form outer circumferential surface and/or the second ramp-form outer circumferential surface can be formed with a convex curvature. If both the first and the second sleeve body are formed with convex outer circumferential surfaces, they can have identical radii of curvature or curvature progressions with different external diameters. However, it can also be provided that the outer circumferential surfaces have different curvature progressions. A convex shape of the ramp-form course of the outer circumferential surface affords the advantage, due to the radial bulging thereof, that the sleeve bodies can indeed be inserted axially into the component and they centre themselves and are applied due to the ramp shape of the outer circumferential surfaces. However, the sleeve bodies do not project axially very far into the component. Thus, components which only have a short axial extent can also be clamped reliably and securely between the sleeve bodies.

It can also be provided that the first ramp-form outer circumferential surface and/or the second ramp-form outer circumferential surface is formed with a concave curvature. If both the first and the second sleeve body are formed with concave outer circumferential surfaces, they can have identical radii of curvature or curvature progressions with different external diameters. However, it can also be provided that the outer circumferential surfaces have different curvature progressions. The concave shape of the outer circumferential surfaces allows a particularly easy insertion of the sleeve bodies into an inner hole in the component. This is particularly advantageous for components which have narrow inner holes.

In general, the different shapes of the ramp-form course of the outer circumferential surfaces can be combined together in the tool. For example, the first sleeve body can have a conical first outer circumferential surface and the second sleeve body can have a convexly curved second outer circumferential surface. Of course, further combinations are conceivable.

It can be provided that the spindle has an external thread. Accordingly, the spindle can be configured in particular as a threaded spindle. This provides the advantage that additional functional components can be easily fixed to the spindle.

The pressure bodies can be configured as screw-down nuts. Accordingly, the pressure bodies can be configured as sleeve-shaped bodies with an internal thread. The pressure bodies can thus be screwed onto the spindle. In particular, the positioning of the pressure bodies relative to one another on the spindle can be changed simply by rotating the respective pressure body.

In general, it can be provided that the pressure bodies are hat-shaped. The pressure bodies can thus be configured as sleeve-shaped bodies. In particular, the first and the second pressure body can have a respective functional portion or functional region and a band, the band having a greater diameter than the functional portion. The functional portion can be configured in particular as a hexagon. The band affords the advantage that a contact surface for resting on the respective sleeve body is increased.

It can also be provided that the tool also has a coupling element which can be coupled to an end portion of the spindle. The coupling element is provided for mechanically coupling further components to the spindle and forms in particular a connector between the spindle and a further component.

In particular, the coupling element can be connected in a releasable manner to the spindle. This makes it possible to provide different coupling elements for different components which are to be coupled. This further broadens the range of use of the tool. For example, the coupling element can have an internal thread by which it can be screwed onto the spindle. It is also conceivable for the coupling element to have a mandrel with an external thread, it being possible to screw the mandrel into a hole which is formed in the end of the spindle and which has an internal thread. Furthermore, structures which form a bayonet catch can be provided together in the end portion of the spindle and on the coupling element.

As an alternative to a coupling element which can be coupled, it can be provided that the spindle has a coupling element which is formed on an end portion, integrally therewith. This measure reduces the number of detachable components of the tool.

It can be provided that the tool also has a striking device with an impact component, which can be coupled to the spindle, and a striking body which is movable against an impact body of the impact component. The striking device can be coupled to the spindle in particular by means of the coupling element. It can also be provided that the striking device itself has a structure which can be directly coupled or connected to the spindle, such as a hole with an internal thread. In particular, the striking device can be connected mechanically to the spindle. This means that due to the coupling, a force, in particular an axial force can be transmitted onto the spindle from the striking device along the longitudinal axis of the spindle. Thus the striking device provides a simple possibility for applying a force to the spindle for inserting a component into, or removing a component from a mount.

The impact body can be configured for example as a disc or block which provides a surface against which the striking body can strike. In the simplest case, the striking body can be a hammer using which the user of the tool can strike against the impact body in order to apply a force to the spindle. A region for applying force in jolts is provided by the impact body. This affords the advantage that high peak forces can be produced, as a result of which even very firmly seated components can be reliably removed from mounts by the tool.

It can be provided that the impact component has a guide piece on which the striking body is movably guided, and the impact body can be connected or is connected to the guide piece. In particular, an elongate, for example, a bar-shaped or rail-shaped component is thereby provided as the guide portion of the impact component. In particular, the guide piece can be coupled to the spindle by a first end portion. The impact body can be provided on a second end portion, positioned opposite the first end portion, of the guide piece. The impact body can be coupled in particular in a releasable manner to the guide piece. For example, the impact body can be configured such that it can be screwed onto the guide piece. Alternatively, the impact body and the guide piece can also be rigidly interconnected, particularly in an integrally bonded manner, for example welded, or in a force-locking manner, for example by a press fit. In particular, the guide piece and the impact body can also be rigidly interconnected in that they are formed integrally.

A hollow cylinder or a block-shaped body can be provided in particular as the striking body. The striking body can have for example an inner hole through which the guide piece can be guided. It is also conceivable that the guide piece has a guide recess, for example in the form of a groove, which extends along the guide piece and forms a guide path. Accordingly, it is possible to provide on the striking body a guide attachment which can be received in the guide path to guide the striking body on the guide piece and which is movable in the guide path.

It can be provided that the impact component can be coupled to the spindle by means of the coupling element. Accordingly, the coupling element can have a coupling region for coupling the impact component and optionally a further coupling region for coupling to the spindle. In particular, a first end portion of the guide piece of the impact component can be coupled to the spindle by the coupling element.

It can be provided that the tool has, according to the modular principle, a selection of different spindles, different sleeve bodies and/or different pressure bodies. In particular, it is possible to provide a plurality of spindles of different lengths and/or of different external diameters and/or different types of thread and/or with different thread sizes. Furthermore, it is possible to provide a plurality of different sleeve bodies having different external diameters and/or different ramp-form courses of the outer circumferential surfaces, for example different cone angles, and/or different shapes of the ramp-form outer circumferential surfaces, for example two sleeve bodies with conical outer circumferential surfaces and two with convexly curved outer circumferential surfaces. The pressure bodies can have different forms, for example different screw-down nuts with and without a band can be provided. Of course, the pressure bodies can also be present with different diameters and/or thread sizes. If appropriate, it is also possible to provide a plurality of different striking devices with different types of striking bodies and/or with different sizes of striking bodies and/or with different guide pieces and/or with different impact bodies.

The modular principle thus creates a set of tools which can be used for inserting or removing all kinds of components.

According to a further aspect of the invention, a method is provided for inserting or removing components, in particular bearings, bushes or the like, particularly in the automotive sector, into or from a component mount. The method has the following steps:

bringing a first ramp-form outer circumferential surface of a first sleeve body into contact with a first end region of a wall, defining an inner hole, of the component;

bringing a second ramp-form outer circumferential surface of a second sleeve body into contact with a second end region, opposite the first end portion, of the wall, defining the inner hole, of the component, a spindle being guided axially through a through-hole in the first sleeve body, through the inner hole in the component and also through a through-hole in the second sleeve body;

axially applying a force to the first sleeve body in the direction of the second sleeve body by means of a first pressure body;

axially applying a force to the second sleeve body in the direction of the first sleeve body by means of a second pressure body; and axially applying a force to the spindle and thereby moving the component out of or into the bearing mount.

The method can be carried out in particular using the above-described tool.

According to an aspect of the invention, in the method, the sleeve bodies are placed against an inner hole in the component from opposite sides, the spindle is guided through the sleeve bodies and the inner hole and the sleeve bodies are subjected to a force by the pressure bodies with forces which are directed towards one another. Furthermore, a force is applied to the spindle along the longitudinal axis thereof. The ramp-form shape of the outer surfaces of the sleeve bodies causes a centring of the tool with respect to the hole inside the component and also a reliable contact on the component. Thus, a separate orientation of the tool is not necessary, which means that the method can be carried out particularly rapidly. During the application of force, the tool is thus centred overall with a high degree of accuracy with respect to the hole inside the component. The component is thereby reliably prevented from becoming jammed in the component mount due to the axial application of force.

With regard to the time sequence of the steps of the method, it can be provided in particular that the first sleeve body and the first pressure body have already been pushed onto the spindle and the spindle is introduced from one side into the hole inside the component such that, first of all, the first ramp-form outer circumferential surface comes into contact with the first peripheral region of the inner hole. Thereafter, the second sleeve body can be pushed from the opposite side onto the spindle and can be brought into contact with the second peripheral region of the inner hole and the force can be applied by the pressure bodies. Of course, a different time sequence can also be provided. For example, the outer circumferential surfaces of the sleeve bodies can also be brought simultaneously into contact with the respective peripheral region of the hole.

It can be provided that a force is applied axially to the spindle by a jolt-wise application of the force due to a movement of a striking body against an impact body of an impact component coupled to the spindle. Accordingly, the component can be knocked in particular into or out of the mount. In particular during the removal of components, this affords the advantage that very high axial forces in terms of amount are achieved due to the dynamic application of force. It is thereby also possible for very firmly seated components to be quickly and reliably removed from the mount.

As used herein, components which are formed "in one piece", "in one part" or "integrally" are generally understood as meaning that these components are present as a single part which forms one material unit and in particular are produced as such, where one of the other components cannot be detached from the other components without breaking the material cohesion.

With regard to directional information and axes, particularly with regard to directional information and axes relating to the course of physical structures, a course of an axis, of a direction or of a structure "along" another axis, direction or structure as used herein is understood as meaning that these, in particular the tangents resulting in a respective location of the structures, respectively run at an angle of less than or equal to 45 degrees, for example less than or equal to 30 degrees and for example even parallel to one another.

With regard to directional information and axes, particularly with regard to directional information and axes relating to the course of physical structures, a course of an axis, of a direction or of a structure "transversely" to another axis, direction or structure as used herein is understood as meaning that these, in particular the tangents resulting in a respective location of the structures, respectively run at an angle of more than or equal to 45 degrees, for example more than or equal to 60 degrees and for example even parallel to one another.

BRIEF DESCRIPTION OF THE DRAWINGS

In the following, the invention will be described with reference to the drawings, in which.

Figure 1:
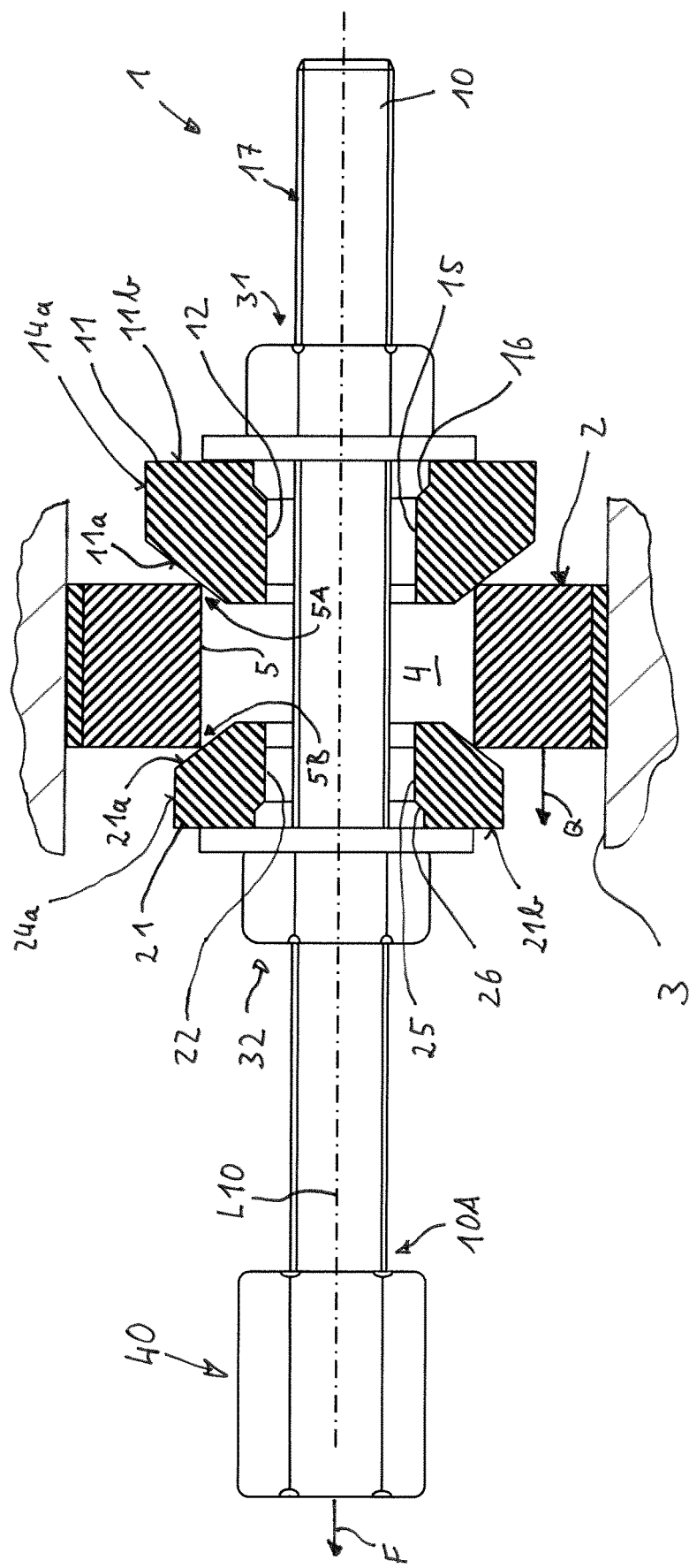
FIG. 1 is a sectional view of a tool according to an embodiment of the present invention, the tool being shown in an assembled state during the insertion or removal of a component.

In the drawings, the same reference signs denote identical or functionally identical components, unless indicated otherwise.

DETAILED DESCRIPTION OF EMBODIMENTS

FIG. 1 shows by way of example a tool 1 according to an embodiment of the present invention in an assembled state during the insertion or removal of a component 2 into or from a component mount 3. The component 2 can be formed in particular by a bearing, as shown schematically in FIG. 1. In particular, the component 2 can be a wheel bearing of a motor vehicle. However, in general the component 2 can be formed by a bearing, a sealing element, a bush or the like, such as silent bearings, hydraulic mounts, ball bearings, shaft seals, rubber bearings or the like.

The tool 1 is provided for inserting the component 2 into or removing the component from the component mount 3, and it has a spindle 10, a first sleeve body 11, a second sleeve body 21, a first pressure body 31 and a second pressure body 32. Furthermore, the tool can optionally have a coupling element 40. In addition, the tool 1 can optionally also have a striking device 50, as shown by way of example in FIG. 3.

Figure 2:
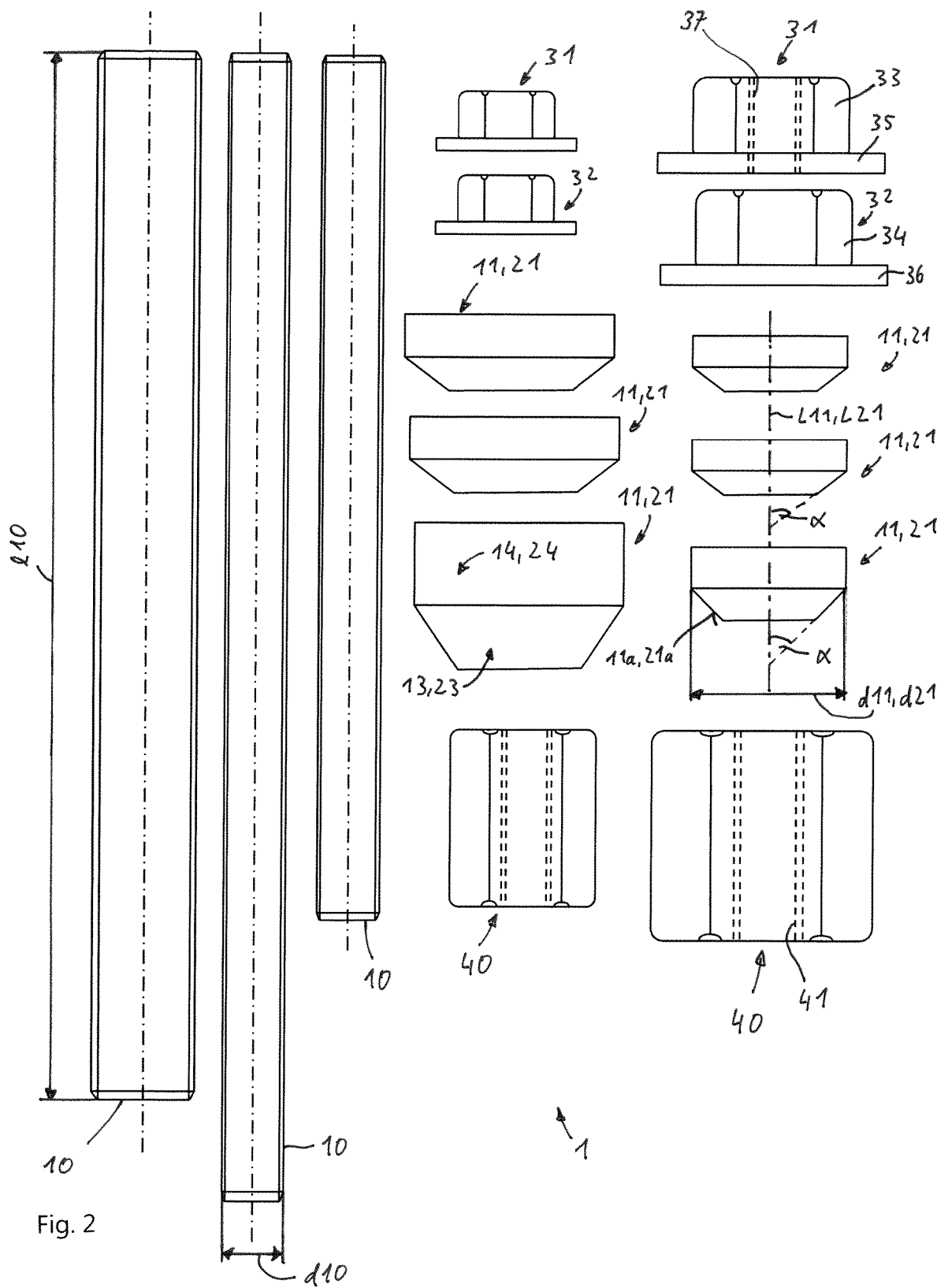
FIG. 2 is a schematic view of a tool, present as a tool set, according to an embodiment of the present invention.

As shown by way of example in FIG. 2, the tool 1 can be present according to the modular principle as a tool set which has a selection of different spindles 10, different sleeve bodies 11, 21 and/or different pressure bodies 31, 32. The tool set can optionally also have a selection of different coupling elements 40 and/or different striking devices 50.

The spindle 10 is configured as an elongate shaft or rail with a longitudinal axis L10 which defines an axial direction. As shown schematically in FIGS. 1 and 2, the spindle 10 can have in particular an external thread 17. In particular, a plurality of spindles of different lengths l10 or with different external diameters d10 can be provided in the tool set. For example, a spindle 10 with a length l10 of 25 cm, a spindle 10 with a length l10 of 35 cm and a spindle 10 with a length l10 of 20 cm can be provided. In general, the length l10 of the spindle 10 can be in particular within a range of between 120 cm and 10 cm. Additionally or alternatively to the different lengths l10, it is also possible to provide a plurality of spindles 10 with different external diameters d10 in the tool set. For example, one of the spindles 10 can have an ISO metric thread of diameter M10, a further spindle 10 can have an ISO metric thread of diameter M16 and a further spindle 10 can have an ISO metric thread of diameter M18. Of course, it is also possible to provide spindles 10 which have different types of thread, in particular trapezoidal threads, Whitworth threads, round threads, buttress threads or the like. In general, the external diameter d10 of the spindle 10 can lie within a range of between 5 mm and 50 mm.

The first sleeve body 11 has a first ramp-form outer circumferential surface 11a and a through-hole 12. The spindle 10 can be guided axially through the through-hole 12. In the assembled state of the tool 1 which is prepared in particular for inserting or removing the component 2, the spindle 10 has been guided axially through the through-hole 12 in the first sleeve body 11, as shown by way of example in FIG. 1.

The second sleeve body 21 has a second ramp-form outer circumferential surface 21a and a through-hole 22. The spindle 10 can be guided axially through the through-hole 22 in the second sleeve body 21. In the assembled state of the tool 1, the spindle 10 has been guided axially through the through-hole 22 in the second sleeve body 21, as shown by way of example in FIG. 1.

Figure 4:
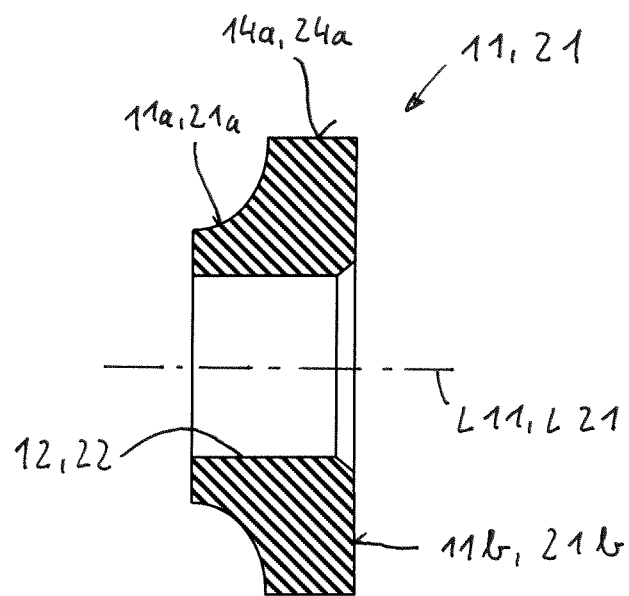
FIG. 4 is a sectional view of a sleeve body of the tool according to a further embodiment of the present invention, the sleeve body having a concavely running ramp-form outer circumferential surface.
Figure 5:
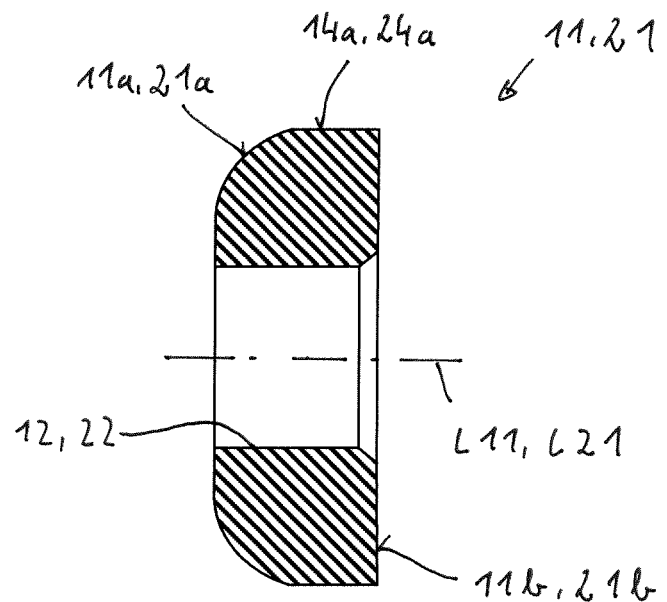
FIG. 5 is a sectional view of a sleeve body of the tool according to a further embodiment of the present invention, the sleeve body having a convexly running ramp-form outer circumferential surface.

As shown in FIG. 1, the first and the second outer circumferential surface 11a, 21a of the sleeve bodies 11, 21 can be formed conically. As shown by way of example in FIG. 4, the outer circumferential surface 11a, 21a of the first and/or second sleeve body 11, 21 can also be formed with a concave curvature. Furthermore, FIG. 5 shows that a convexly curved shape of the outer circumferential surface 11a, 21a of the first and/or second sleeve body 11, 21 can also be provided.

In the following, for the sake of simplicity, reference will only be made to a conical shape of the outer circumferential surface 11a, 21a of the sleeve bodies 11, 21. Unless indicated otherwise, the details also apply analogously to a generally ramp-form shape, in particular to a convexly or concavely curved shape of the outer circumferential surface 11a, 21a of the respective sleeve body 11, 21.

The second sleeve body 21 can be provided such that the second conical outer circumferential surface 21a is positioned facing the first conical outer circumferential surface 11a. Particularly in the assembled state of the tool, the first sleeve body 11 and the second sleeve body 21 are pushed onto the spindle 10 such that the first outer circumferential surface 11a and the second outer circumferential surface 21a are oriented facing one another, as shown in FIG. 1.

As shown schematically in FIG. 2, the conical outer circumferential surfaces 11a, 21a respectively extend as a surface of revolution around a sleeve centre axis L11, L21, and respectively include therewith a cone angle α. As also shown schematically in FIG. 2, the sleeve bodies 11, 21 can respectively have a conical region 13, 23, i.e. generally an axially tapering ramp region, and a cylindrical region 14, 24 which axially adjoins said conical region. The cylindrical regions 14, 24 each have an outer circumferential surface 14a, 24a which extends cylindrically around the sleeve centre axis L11, L21.

The first sleeve body 11 can have a first end face 11b which is located opposite the first conical outer circumferential surface 11a with respect to the first sleeve centre axis L11 and which is provided to be contacted by the first pressure body 31. The second sleeve body 21 can have a second end face 21b which is located opposite the second conical outer circumferential surface 21a with respect to the second sleeve centre axis L21 and which is provided to be contacted by the second pressure body 32. In the assembled state of the tool 1, the pressure bodies 31, 32 can be respectively contacted on the end faces 11b, 21b, and they respectively rest against said end faces to apply pressure, as shown by way of example in FIG. 1.

The through-holes 12, 22 in the sleeve bodies 11, 21 can be respectively configured as cylindrical holes. As shown by way of example in FIG. 1, it can be provided in particular that the through-holes 12, 22 have in each case a cylindrical portion 15, 25 and a conical portion 16, 26 which axially adjoins the cylindrical portion and widens the internal diameter of the respective through-hole 12, 22.

As shown by way of example in FIG. 2, the tool set can comprise a selection of different sleeve bodies 11, 21. In particular, a plurality of sleeve bodies 11, 21 with different external diameters d11, d21 and/or with different cone angles α can be provided. Of course, a plurality of sleeve bodies 11, 21 having through-holes which differ in diameter can also be provided. Furthermore, the same tool set can contain sleeve bodies 11, 21 with different ramp-form shapes of the outer circumferential surface 11a, 21a.

The first and the second pressure body 31, 32 are respectively provided for applying pressure to the sleeve bodies 11, 21 and can be configured in particular as screw-down nuts, as shown schematically in FIGS. 1 and 2. In particular, the pressure bodies 31, 32 can be respectively configured in the shape of a hat with a functional region 33, 34 and a band 35, 36, as can be seen in particular in FIG. 2. The band 35, 36 has a greater external diameter than the functional region 33, 34 and is provided for resting against the end face 11b, 21b of the respective sleeve body, as shown schematically in FIG. 1. In particular, the screw-down nuts can have an internal thread 37, by which they can be screwed onto the spindle 10. The functional region 33, 34 can be configured in particular as a hexagon, as shown schematically in FIG. 2.

As shown by way of example in FIG. 2, the tool set can comprise a selection of different pressure bodies 31, 32. In particular, the pressure bodies 31, 32 can have different internal diameters and different internal threads.

As shown in particular in FIG. 2, the tool 1 can also have a coupling element 40 which can be coupled to an end portion 10A of the spindle 10. In particular, the coupling element 40 can have an internal thread 41, as shown schematically in FIG. 2, by which the coupling element 40 can be coupled releasably to the end portion 10A of the spindle 10. In FIG. 1, the coupling element 40 is shown in a state coupled to the spindle 10. Furthermore, the internal thread 41 is provided for coupling to further components, for example to a striking device which is described in more detail in the following.

Alternatively, it can also be provided that the coupling element 40 is formed integrally with the end portion 10A of the spindle 10, in particular it is connected thereto in a non-releasable manner. Here, the coupling element 40 can also have the internal thread 41 which, in this case, is formed in a blind hole in the coupling element 40 and is used to couple further components to the spindle 10.

As shown by way of example in FIG. 2, the tool set can have a selection of different coupling elements.

The tool 1 can also have a striking device 50. As shown by way of example in FIG. 3, the striking device 50 can have an impact component 51 which can be coupled to the spindle 10, and a striking body 52 which is movable against an impact body 54 of the impact component 51.

Figure 3:
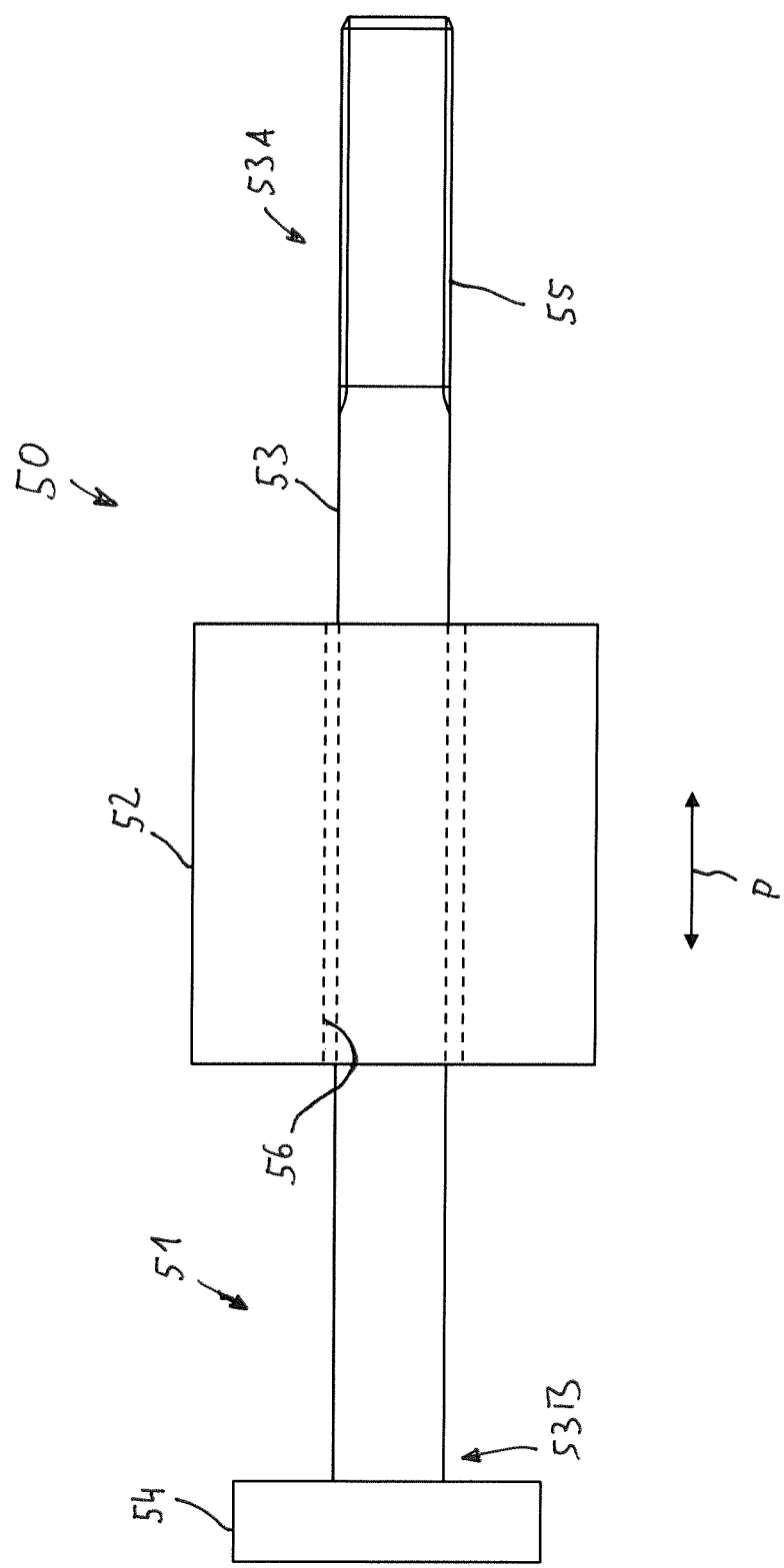
FIG. 3 shows a striking device of the tool according to a further embodiment of the present invention.

The impact body 54 can be formed in particular in the shape of a disc or plate, as shown schematically in FIG. 3. The impact body 54 can either be coupled directly to the spindle 10 or to the coupling element 40, or can be coupled by means of a guide piece 53.

The guide piece 53 can be formed in particular as a bar-shaped or rail-shaped elongate body, as shown by way of example in FIG. 3. The guide piece can have a circular cross section. However, in particular a rectangular, triangular, elliptic or polygonal cross section can also be provided.

The guide piece 53 can be coupled to the spindle 10 in particular by a first end portion 53A. For this purpose, it is possible to provide on the guide piece 53 an external thread 55 which is formed at least in the region of the end portion 53A of the guide piece 53. The external thread 55 can be screwed into the internal thread 41 of the coupling element 40. The impact component 51 can thus be coupled to the spindle 10 in particular by means of the coupling element 40.

The impact body 54 can be arranged at a second end portion 53B, opposite the first end portion 53A, of the guide piece 53. The impact body 54 can be connected to the guide piece 53, for example it can be connected releasably thereto, for example by means of a thread (not shown), or it is connected to the guide piece 53, for example formed integrally therewith or welded thereto or the like.

Furthermore, the striking device 50 can have a striking body 52. This can be movably guided in particular on the guide piece 53, as schematically shown in FIG. 3, and indicated by the arrow P.

The striking body 52 can be formed in particular as a cylindrical component with an inner hole 56, through which the guide piece 53 can be guided, as shown schematically in FIG. 3.

Of course, it is also possible to provide in the tool set a selection of different striking devices, for example with different guide pieces 53 and/or different striking bodies 52 and/or different impact pieces 54.

In the following, a method for inserting or removing the component 2 into or from the component mount 3 is described by way of example based on FIG. 1 and with reference to the above-described tool.

In the method, the first ramp-form, in particular conical outer circumferential surface 11a of the first sleeve body 11 is brought into contact with a first end region 5A of a wall 5, defining an inner hole 4, of the component 2. Furthermore, the second ramp-form, in particular conical outer circumferential surface 21a of the second sleeve body 21 is brought into contact with a second end region 5B, opposite the first end region 5A, of the wall 5 of the component 2. Accordingly, the component 2 is arranged axially between the first and the second sleeve body 11, 21, or they are arranged on opposite sides of the component 2, as shown by way of example in FIG. 1.

As further shown in FIG. 1, the sleeve bodies 11, 21 partly extend axially into the hole 4 inside the component 2. As a result, the sleeve bodies 11, 21 are automatically centred with respect to the hole 4 inside the component 2 due to the rotational symmetry of the outer circumferential surfaces 11a, 21a relative to the respective sleeve centre axis L11, L21.

The spindle 10 extends axially through the through-hole 12 in the first sleeve body 11, through the hole 4 inside the component 2 and also through the through-hole 22 in the second sleeve body 21.

Furthermore, a force is applied axially to the first sleeve body 11 in the direction of the second sleeve body 21 by means of the first pressure body 31 and a force is applied axially to the second sleeve body 21 in the direction of the first sleeve body 11 by means of the second pressure body 32. For example, the pressure bodies 31, 32 can be screwed onto the spindle 10 from opposite sides, as a result of which the pressure bodies 31, 32 come into contact with the end faces 11b, 21b of the sleeve bodies 11, 21 and press them against the component 2 from opposite sides. As a result, the component 2 is clamped axially between the sleeve bodies 11, 21.

When the component is clamped between the sleeve bodies, a force F is applied axially to the spindle 10 and as a result, the component 2 moves out of or into the bearing mount 3, as indicated schematically by arrow Q in FIG. 1.

It can be provided that the force F is applied axially to the spindle 10 by a jolt-wise application of said force F as the result of a movement of the striking body 52 against the impact body 54 of the impact component 51 coupled to the spindle 10.

Although the present invention has been explained above by way of example with reference to embodiments, it is not restricted thereto, but can be modified in many different ways. In particular, combinations of the above embodiments are also conceivable.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 10 2016 213 811, filed Jul. 27, 2016, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A system comprising:
a component, wherein the component is a single piece and comprises an inner hole;
a component mount to receive the component; and
a tool for inserting and removing the component into or from the component mount, wherein the component includes the inner hole extending from a first side of the component to an opposed second side of the component, the tool comprising:

a spindle;
a first sleeve body with a first ramp-form outer circumferential surface for resting against the component in a clearance-free and centred manner, a first cylindrical outer circumferential surface that axially adjoins and directly continues without a step to said first ramp-form outer circumferential surface, and a through-hole, through which the spindle can be axially guided;
a second sleeve body with a second ramp-form outer circumferential surface for resting against the component in a clearance-free and centred manner, a second cylindrical outer circumferential surface that axially adjoins and directly continues without a step to said second ramp-form outer circumferential surface, and a through-hole, through which the spindle can be axially guided;
a first pressure body which can be coupled to the first sleeve body to axially apply pressure thereto;
a second pressure body which can be coupled to the second sleeve body to axially apply pressure thereto; and
a striking device including an impact component configured for being coupled to the spindle and a striking body which is movable against an impact body of the impact component such that a force is applied axially to the spindle to move the component out of or into the component mount,
wherein, with the spindle configured to extend through the through-holes of the first and second sleeve bodies and the first ramp-form outer circumferential surface and the second ramp-form outer circumferential surface face each other, the ramp-form outer circumferential surfaces respectively taper along the respective sleeve centre axis such that the first and second ramp-form surfaces are configured for being introduced in part into the inner hole of the component from the first and second sides
wherein the through-hole of the first sleeve body includes a cylindrical portion and a conical portion that axially adjoins the cylindrical portion and widens the internal diameter of the respective through-hole, and wherein the through-hole of the second sleeve body includes a cylindrical portion and a conical portion that axially adjoins the cylindrical portion and widens an internal diameter of the respective through-hole, and
wherein the first sleeve body and the second sleeve body at least partly extend axially into the inner hole of the component and thereby are automatically centered with respect to the inner hole of the component due to the rotational symmetries of the first ramp-form outer circumferential surface of the first sleeve body and of the second ramp-form outer circumferential surface of the second sleeve body relative to the respective sleeve center axis.

2. A method for inserting or removing components into or from a component mount in the system of claim 1, comprising the steps:
bringing the first ramp-form outer circumferential surface of the first sleeve body into contact with a first end region of a wall, defining the inner hole, of the component;
bringing the second ramp-form outer circumferential surface of the second sleeve body into contact with a second end region, opposite the first end region, of the wall, defining the inner hole, of the component, the spindle being axially guided through the through-hole in the first sleeve body, through the inner hole inside the component and also through the through-hole in the second sleeve body;

axially applying a force to the first sleeve body in a direction of the second sleeve body by means of the first pressure body;

axially applying a force to the second sleeve body in a direction of the first sleeve body by means of the second pressure body; and axially applying a force to the spindle and thereby moving the component out of or into the component mount; wherein the component mount is a bearing mount.

3. The method of claim 2, wherein a force is applied axially to the spindle by a jolt-wise application of said force as the result of a movement of the striking body against the impact body of the impact component coupled to the spindle.

* * * * *